Figure 1:
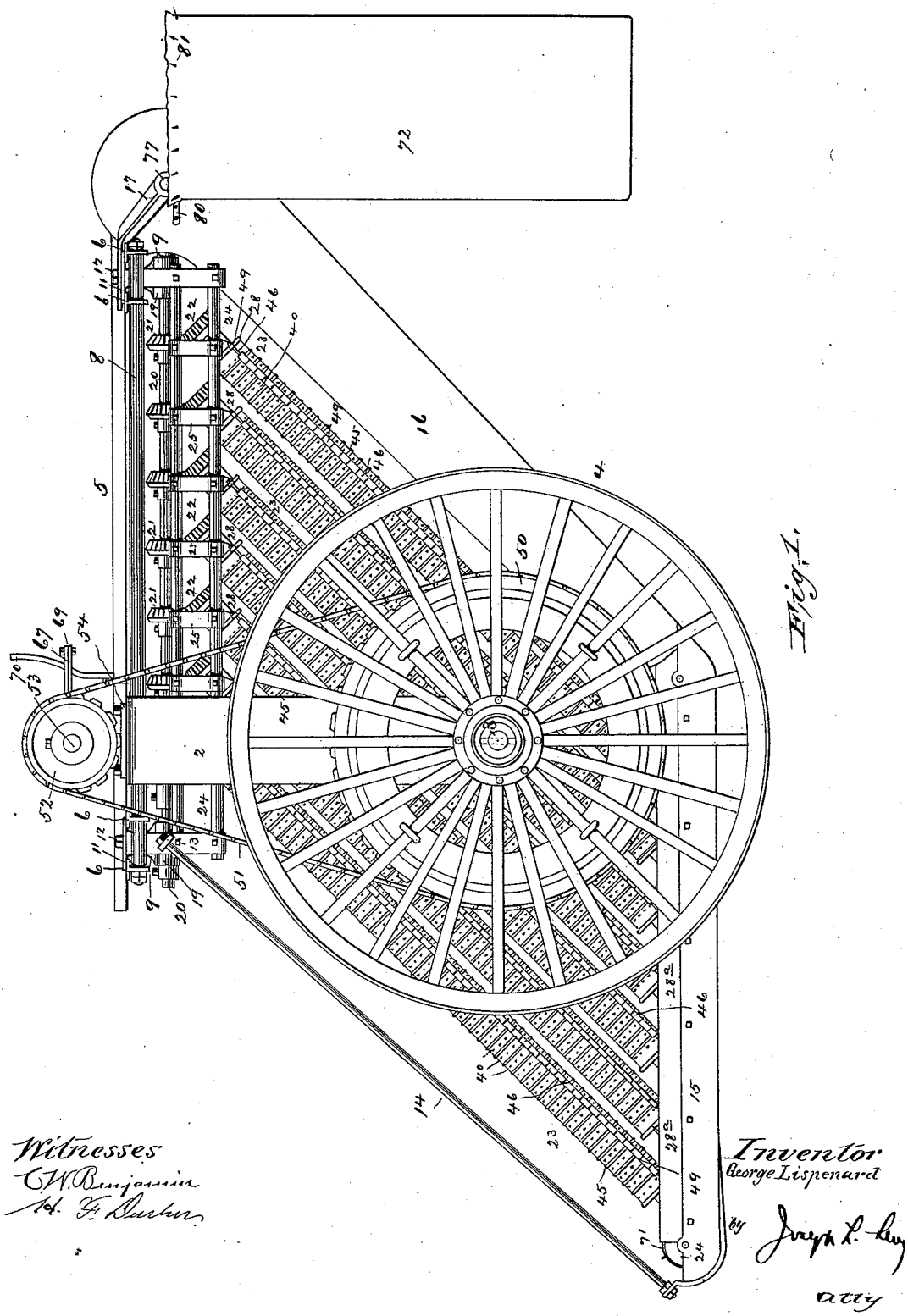

(No Model.) 8 Sheets—Sheet 1.

G. LISPENARD.
COTTON HARVESTER.

No. 540,919. Patented June 11, 1895.

Witnesses
C. W. Benjamin
H. F. Durbin

Inventor
George Lispenard
by Joseph L. Levy
atty (No Model.)

G. LISPENARD.
COTTON HARVESTER.

No. 540,919.   Patented June 11, 1895.

Witnesses:
C. W. Benjamin
H. F. Dunbar

Inventor
George Lispenard
by Joseph L. Levy
atty (No Model.) 8 Sheets—Sheet 5.

G. LISPENARD.
COTTON HARVESTER.

No. 540,919. Patented June 11, 1895.

Witnesses,
C. W. Benjamin
H. F. Dunbar

Inventor
George Lispenard.
by Joseph L. Levy
atty (No Model.)  8 Sheets—Sheet 6.
G. LISPENARD.
COTTON HARVESTER.
No. 540,919. Patented June 11, 1895.
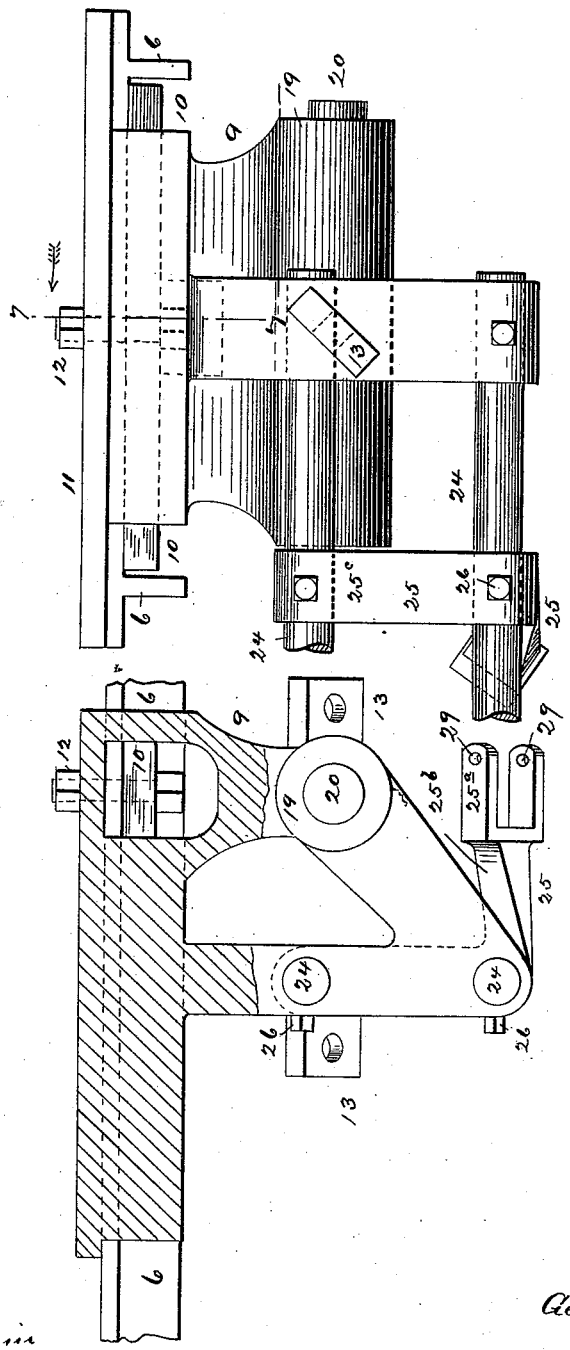
Witnesses,
C. W. Benjamin
H. F. Dunbar
Inventor,
George Lispenard
by Joseph L. Levy
atty (No Model.) 8 Sheets—Sheet 7.
G. LISPENARD.
COTTON HARVESTER.
No. 540,919. Patented June 11, 1895.
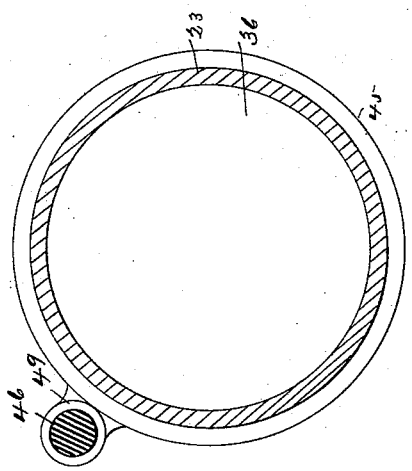
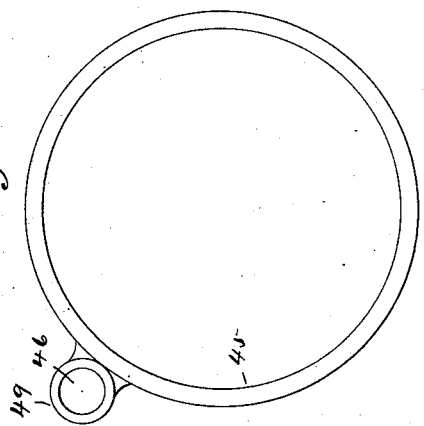
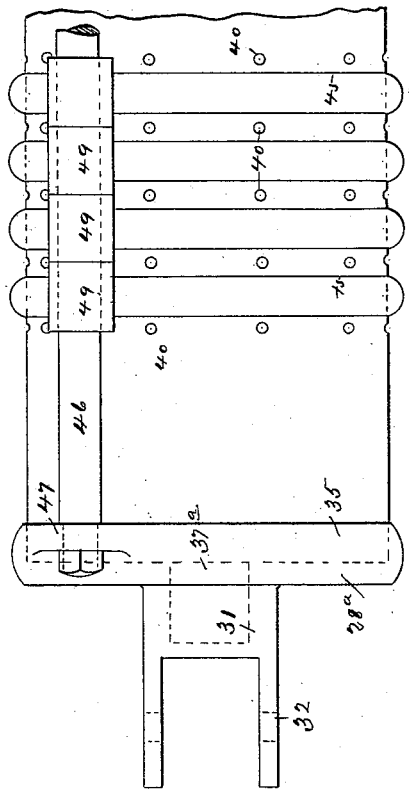
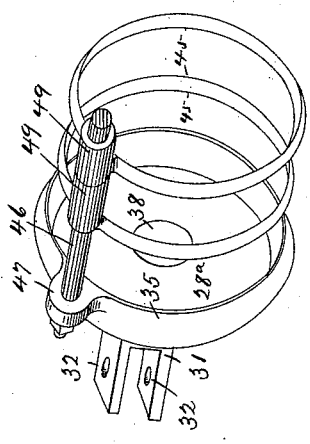
Witnesses:
Inventor
George Lispenard
by Joseph L. Levy
atty (No Model.) 8 Sheets—Sheet 8.
G. LISPENARD.
COTTON HARVESTER.
No. 540,919. Patented June 11, 1895.
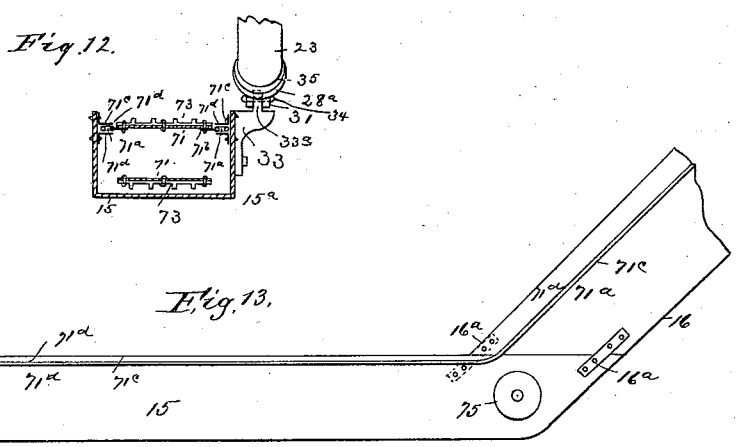
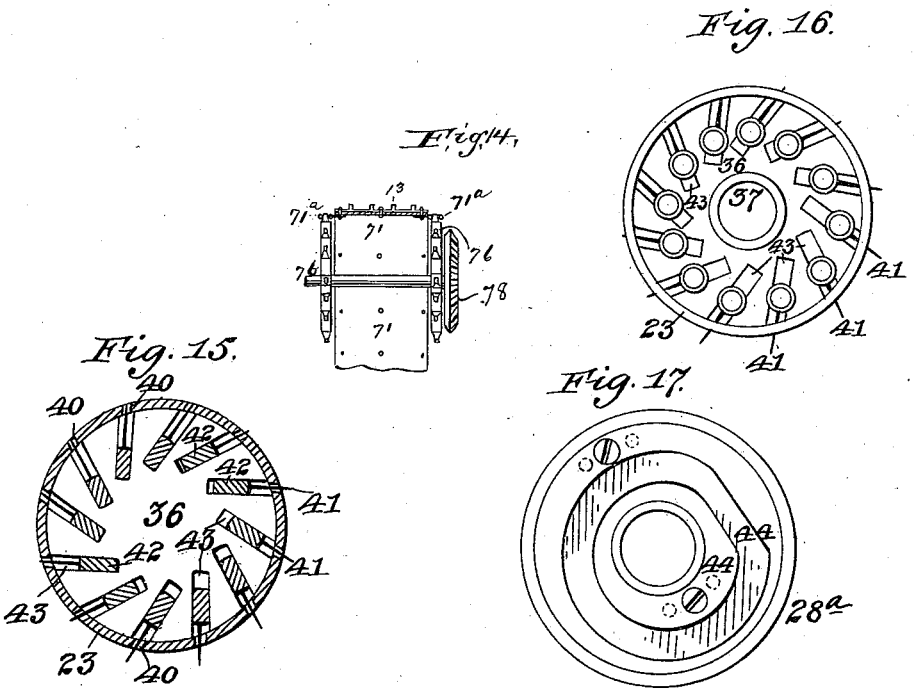
Attest,
C. W. Benjamin
H. F. Dunbar
Inventor
George Lispenard.
by Joseph L. Levy
Atty

UNITED STATES PATENT OFFICE.

GEORGE LISPENARD, OF BROOKLYN, ASSIGNOR TO SOLOMON K. LICHTENSTEIN, TRUSTEE, OF NEW YORK, N. Y.

COTTON-HARVESTER.

SPECIFICATION forming part of Letters Patent No. 540,919, dated June 11, 1895.

Application filed July 29, 1893. Serial No. 481,852. (No model.)

*To all whom it may concern:*

Be it known that I, GEORGE LISPENARD, a citizen of the United States, residing at Brooklyn, in the county of Kings and State of New York, have made certain new and useful Improvements in Cotton-Harvesters, of which the following is a specification.

My invention relates to that class of cotton harvesters or pickers wherein a series of stems or cylinders, having hackle pins or fingers, are carried by a suitable frame or vehicle, when in use straddling the rows of cotton bushes, the cylinders being arranged in sets or pairs forming opposing walls to permit the cotton bush to pass between them to enable said hackles or fingers to grasp the cotton.

The object of the invention is to arrange the pickers or hackles in such manner as to more thoroughly pick the cotton from the bolls, and avoid danger of injuring the bush, while also preventing foreign substances from being collected with the cotton.

To these ends my invention consists in placing the picker stems or cylinders in an inclined position preferably about forty-five degrees, so that each cylinder will reach from the lower to the upper part of the cotton bush, and more particularly so that the lower or stronger part of the bush will be engaged by the cylinder, before said cylinder reaches the upper or weaker part of the bush, and further that no vertical or up and down adjustment of the stems will be required to pick the bolls ripening at different heights and seasons.

The invention also consists in improved means for protecting the hackle pins or fingers from injury by contact with sticks, twigs, &c., and for preventing bolls, leaves, &c., from being carried along with the picked cotton.

The invention consists in the details of construction and the combination of parts that will be more fully hereinafter set forth, and then pointed out in the claims.

Reference is to be had to the accompanying drawings, forming part hereof, wherein—

Figure 2:
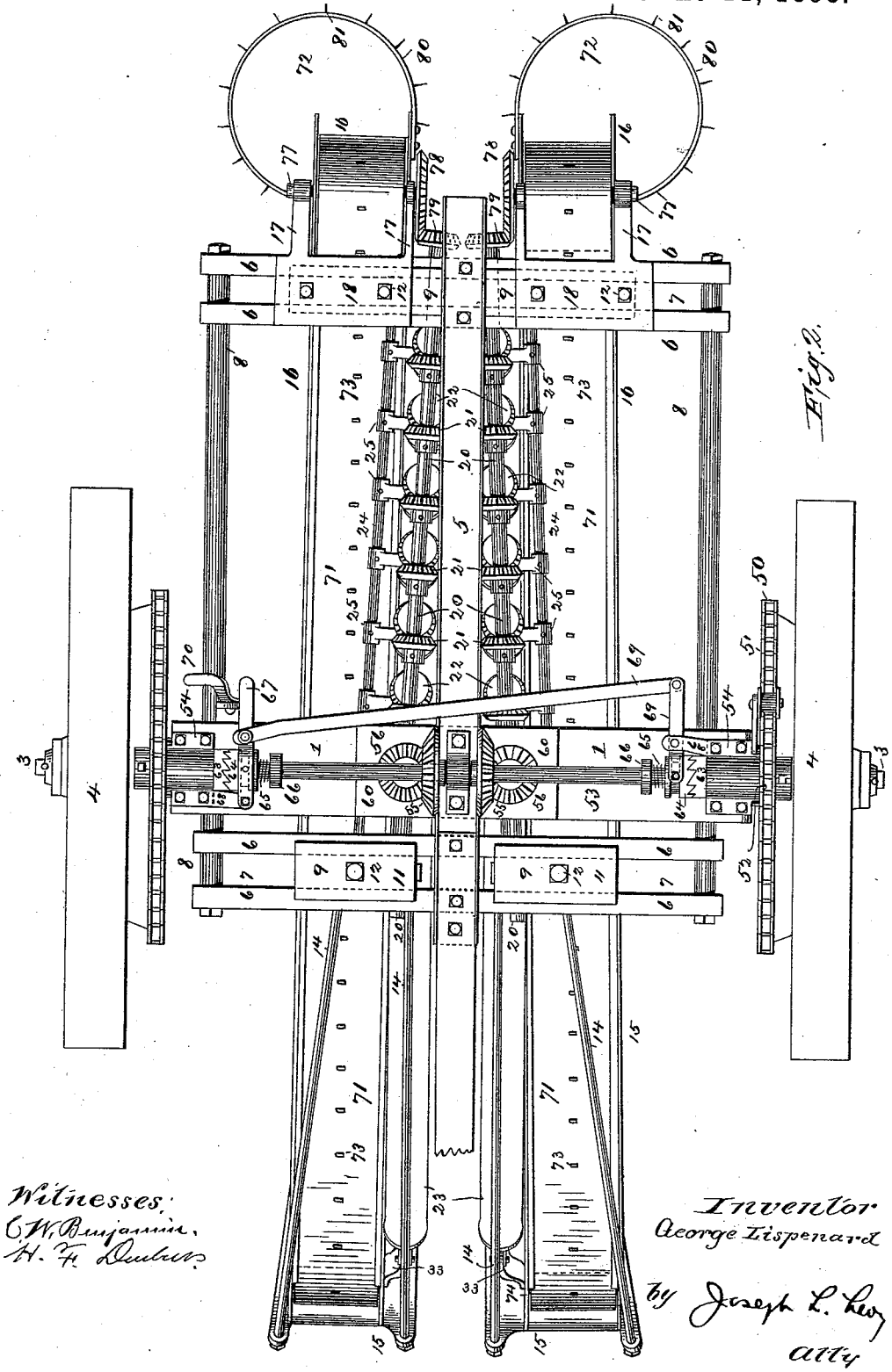
Figure 3:
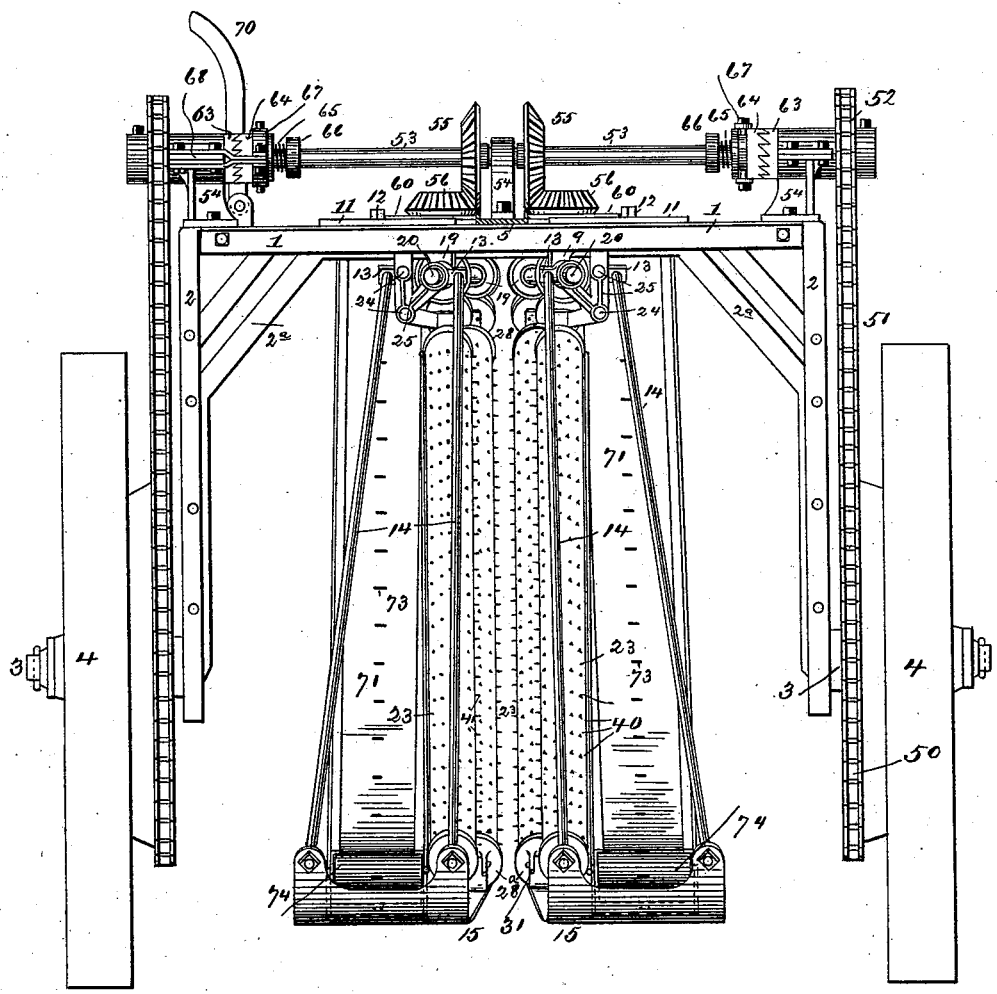
Figure 4:
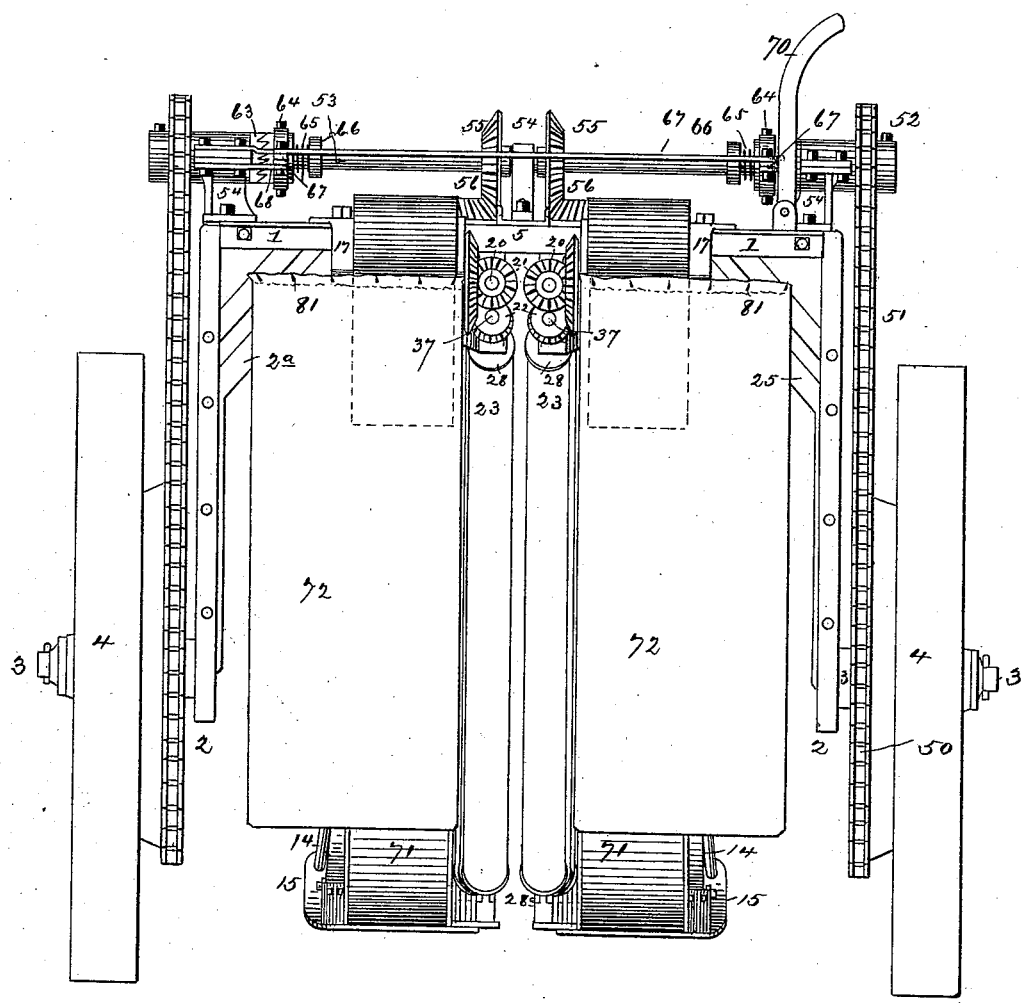
Figure 5:
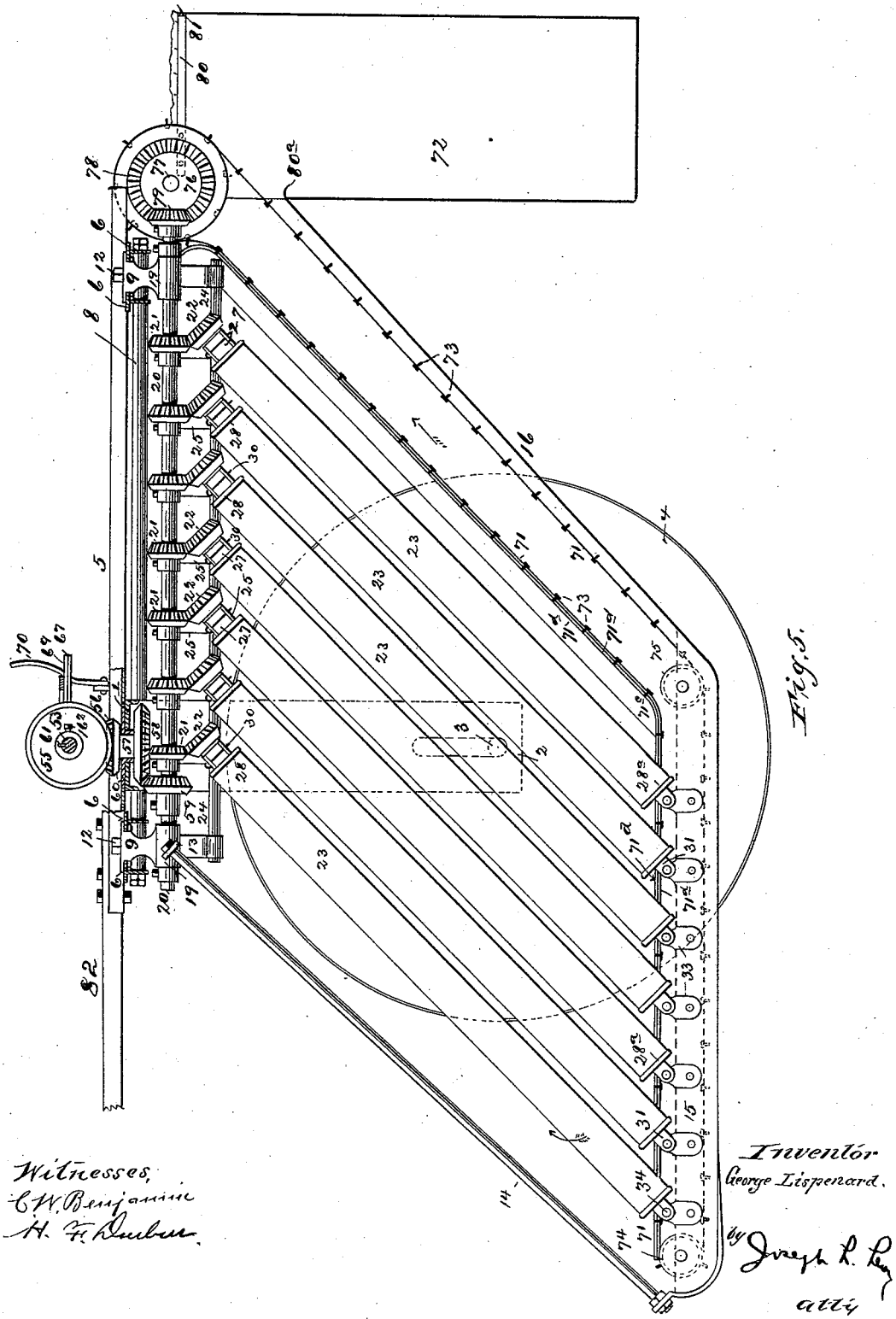

Figure 1 is a side elevation of my improved cotton harvester or picker. Fig. 2 is a plan view of the same. Fig. 3 is a front elevation thereof, looking from the left in Fig 2. Fig. 4 is a rear elevation thereof, looking from the right in Fig. 2. Fig. 5 is a vertical longitudinal section taken through the center of the machine. Fig. 6 is an enlarged detail view of the means for supporting the upper part of the picker stems or cylinders and for permitting lateral adjustment of said cylinders. Fig. 7 is a partly-sectional view of the same, the section being taken on the plane of the line 7 7 in Fig. 6, looking in the direction of the arrow. Fig. 8 is an enlarged detail side view of a portion of a picker-cylinder, showing the means for protecting the hackles or fingers and for dislodging bolls, leaves, &c. Fig. 9 is a cross-section of Fig. 8. Fig. 10 is a perspective view of the cylinder-head and rings, the cylinder being removed. Fig. 11 is an edge view of the ring that surrounds the picker-cylinder for protecting the hackles or fingers. Fig. 12 is a cross-section, enlarged, of the trough 15, showing the manner of supporting the lower part of the picker stems or cylinders. Fig 13 is a longitudinal section, enlarged, of the trough 15 and chute 16; and Fig. 14 is a detail of the elevator-guiding wheels. Fig. 15 is a cross-section of the cylinder or stem, showing the hackle bars and pins. Fig. 16 is an end view thereof, and Fig. 17 is an end view showing the cam for operating the hackle-bars.

The main frame of my machine is shown as composed of a horizontal beam 1, preferably made of channel iron, and uprights 2 carried thereby at its ends, which uprights carry the axles 3, for the main wheels 4.

5 is a beam carried by the cross beam 1, extending horizontally at right angles thereto, and placed about centrally thereof, said beam 5 being preferably made of channel iron.

At opposite ends of the beam 5 are secured beams or rails 6 (preferably T-rails, as in Fig. 5) which extend substantially parallel to the main cross beam 1. The beams or rails 6 support the main operating parts of the machine. The beams or rails 6 are shown arranged in pairs having a space 7 between them, and they are all firmly connected together by longitudinal tie bars or rods 8. (See Fig. 2.) Upon each pair of cross beams 6, 6 are adjustably held hangers or supports 9, 9. (See Figs. 5, 6 and 7.) These hangers 9, 9 are placed upon opposite sides of the central beam 5, as shown in Fig. 2, and are made adjustable laterally of the machine.

In Fig. 6 the hangers 9 are shown provided with side flanges 10 and a top plate 11 to engage the webs of rails or beams 6, a bolt or screw 12 being used to clamp the parts together upon said rails 6 at any desired point of adjustment.

The front hangers 9 carry lugs or projections 13 from which project rods 14 in a downwardly and forwardly direction. Two lugs 13 are shown on opposite sides of each forward hanger 9, and the rods 14 extending therefrom in pairs diverge, or have their ends separated, as in Figs. 2 and 3. This is found desirable so that the lower ends of rods 14 may be spaced a suitable distance while permitting their upper ends to be closer together so as to diminish the dimensions of the structure, and reduce weight.

It will be observed that the lugs 13 are placed at an angle to their support 9, so that the rods 14 can be given the desired inclination. (See Figs. 1, 6 and 7.) The rods 14 at their lower ends are connected to troughs or plates 15 at the forward part of the machine. The rear parts of said troughs or plates 15 are connected with chutes 16 that incline rearwardly and upwardly, and are connected at their ends with arms or supports 17, Fig. 1, the upper side of the chute being open to admit cotton.

The supports 17 are shown in the forms of arms projecting from a plate 18 that is secured on the plates 11 of the rear hangers 9 by the bolts 12, or otherwise as may be found convenient, so that as the rear hangers 9 are moved laterally the chutes are to be correspondingly shifted.

By the above described arrangement of hangers and the parts depending therefrom, I produce two separate adjustable frames or structures on opposite sides of the central beam 5 of the machine, which structures can be moved laterally to any desired position and at any suitable angle to receive cotton bushes between them, as more particularly hereinafter specified.

It will be observed that the structures or frames composed of the hangers 9, rods 14, troughs 15 and chutes 16 form in outline a rhomboidal or oblique frame having one of its acute angles at the lower forward part of the machine, the advantages of which will be set forth hereinafter. Said rhomboidal structures or frames carry the picker stems or cylinders in an upwardly or rearwardly inclined position so that the lower part of said cylinders will first engage the lower parts of the cotton bush, and then gradually advance upwardly along the bush. To accomplish this and to keep the cylinder operating mechanism above the cotton bushes, I have adopted the following arrangement: The hangers 9 are provided with bearings 19 in which are journaled shafts 20, there being one shaft 20 on each side of the central beam 5, and journaled in the respective hangers 9 on each side of the machine. (See Figs. 1, 2, 3 and 5.) The shafts 20 are rotated from the wheels 4, as hereinafter explained. Upon the shafts 20 are secured miter gears 21 that mesh with corresponding gears 22 connected with the inclined rotative picker cylinders 23. The cylinders 23 are supported as follows: The pairs of hangers 9 on corresponding sides of the machine are connected by rods 24, which carry arms, brackets or supports 25 with which the heads 28 of cylinders 23 at their upper parts are connected, whereby the cylinders are supported at that part. The arms or brackets 25 are preferably made in substantially bell-crank form, the two rods 24 passing through two parts of said brackets or supports to hold them firmly and from twisting strains. The arms or supports 25 may be secured upon rods 24 by screws 26. The free ends of the bell-crank arms 25 are shown bifurcated at 25$^a$, so as to receive between them the squared shanks 27 of the cylinder heads 28. (See Fig. 5.) The arms 25 are shown provided with apertures 29 to receive pins or the like 30, so as to lock the shanks 27 of heads 28 in the bifurcated parts 25$^a$ of arms 25. (See Figs. 5 and 7.) In order to conveniently hold the upper cylinder heads at the desired angle, the free portions 25$^b$ of arms 25 are twisted or turned at an angle to the parts 25$^c$, so that the bifurcated parts 25$^a$ will stand at a proper angle corresponding to the angle of inclination of the cylinders 23. (See Figs. 5, 6 and 7.)

The heads 28$^a$, at the lower parts of the cylinders 23, are provided with extensions or shanks 31 by which they are supported. (See Figs. 5, 8, 10 and 12.) The shanks 31 are shown bifurcated and provided with apertures 32, and the shanks 31 are shown in Fig. 12 as straddling standards or supports 33$^a$ on brackets 33 carried by the troughs 15 (or otherwise), pins 34 passing through said standards and through apertures 32 of shanks 31 to hold the parts together.

The brackets 33 are shown carried on the outer vertical wall 15$^a$ of trough 15 and suitably held by bolts or otherwise so that one side of stems or cylinders 23 will project over the trough as in Fig. 12.

The cylinder heads 28, 28$^a$ have side rims or flanges 35 that cover the ends of cylinders 23, and within which said cylinders rotate. In the ends of the cylinders 23 are secured disks or blocks 36. To the disks 36 at the upper end of the cylinder is secured a spindle or shaft 37 that passes through the cylinder head 28, and is secured to the miter wheel 22, so that as the latter turns the cylinder will be carried around with it. At the lower end of the cylinder the corresponding disk 36 carries a spindle or stud 37$^a$ (see dotted lines in Fig. 8) that enters an aperture 38 in head 28$^a$ to guide the cylinders 23 at that part. (See Fig. 10.)

The cylinders 23 are provided with a series of apertures 40, through which hackle pins or fingers 41 are adapted to project. The hackle pins are carried by hackle bars 42 (see Fig. 15) that are supported in slots 43 in the disks 36, the hackle bars 42 extending longitudinally of the cylinders 23, and carrying any desired number of hackle pins 41 to project through apertures 40 in cylinders 23. The hackle pins are to pass in and out through the apertures 40 in the cylinders 23 as the latter rotate, and for this purpose the cylinder heads 28, 28$^a$ are provided with cams or cam grooves 44 that receive the ends of the hackle bars, so that as the cylinders rotate the hackle bars will be moved obliquely or outwardly and inwardly of the cylinders. An arrangement for this purpose is shown in my Patent No. 517,050, dated March 27, 1894, to which cross reference is made, the same forming no part of my present invention. Said cams are so arranged that the hackle pins will be projected from the sides of the cylinders 23 that pass along the cotton bush to engage the ripe cotton, and they will be withdrawn within the cylinders as they are moved from the cotton bush to release the cotton and permit it to fall below to be carried away as hereinafter specified.

I find that sticks, twigs, &c., are liable to lodge between the projecting hackle pins, and to injure or bend the latter as the cylinder rotates. For the purpose of protecting the hackle pins 41 from said injury, and to further prevent foreign substances from being carried into the picked cotton, I place guards 45 upon the cylinders 23 between the circular rows of hackle pins 41. (See Figs. 1 and 8.) The guards 45 project from the surface of the cylinders 23 such a distance as to prevent sticks, &c., from lodging between the projecting hackle pins 41, and the outer surfaces of said guards are preferably rounded as shown in Fig. 8, so as to let the soft cotton lie between them. These guards are composed of annular extensions or rims, and preferably consist of rings fitting loosely upon said cylinders so that the latter may revolve within said rings. (See Figs. 9, 10 and 11.) These ring like guards 45 are held in place upon the cylinders 23 by rods 46 that extend parallel of the cylinders 23, and which are held in place by entering lugs 47 on the cylinder heads 28, 28$^a$. The rods 46 pass through projections, sleeves or tubes 49 on the rings 45. The sleeves or tubes 49 project laterally across the rings 45, so that corresponding ones will abut as in Fig. 8, whereby lateral movement of said rings is prevented, while at the same time they are spaced a proper distance apart so as to permit proper rotary and longitudinal movement of the hackle pins 41, the movements of the hackle pins being so regulated that they will pass the sleeves 49. The rods 46 and sleeves or tubes 49 are at such a distance from the cylinders 23 and so located as to permit the passage of cotton, but to prevent bolls, leaves, &c., from passing around with the hackle pins.

The arrangement for turning the cylinders 23 is as follows: To the wheel 4 is suitably connected a sprocket wheel 50 from which a chain 51 passes to and over a sprocket wheel 52 carried by a shaft 53 extending across the machine parallel with the main cross beam 1. The shaft 53 is journaled in suitable bearings 54 carried by beam 1. The shaft 53 carries miter gears 55 engaging miter gears 56 carried by shafts 57 that are suitably journaled on the beam 1 on the upper side of beam 5. The shafts 57 carry miter gears 58 that mesh with corresponding gears 59 secured on shafts 20, and thus through gears 21 and 22 rotate the cylinders 23 in the proper direction. The shafts 57 are journaled in plates or the like 60 that are adjustably carried by the cross beam 1. The gears 55 are correspondingly adjustable on the shaft 53, say by a spline and feather 61 and set screw 62. (See Fig. 5.) By the foregoing means then the frames or structure carrying the cylinders 23 are moved or adjusted laterally the gearing 55, 56 and 58 and the shafts 57 can be correspondingly adjusted so that gears 58 and 59 can be kept in proper working relation.

As the cylinders 23 are designed to be rotated intermittently or when desired the shaft 53 is connected with the sprockets 52 by clutches, the arrangement of which is as follows: The sprockets 52 are connected with toothed sleeves 63 that turn on shafts 53, and which are adapted to engage toothed collars or sleeves 64 splined on the shafts 53 to have longitudinal motion thereon. The toothed sleeves 63, 64 form clutches for turning shafts 53 by the sprocket wheel 52. The toothed sleeves are properly pressed together by springs 65 that rest against collars 66 on shafts 53 as shown. The clutches 63 are to be disengaged by the operator or driver when it is not necessary for the cylinders 23 to rotate, as when passing from one row of cotton bushes to another. For this purpose I have shown the sliding clutch sleeves 64 suitably connected with levers 67 that are pivoted on supports 68 carried by the main frame, say by attachment to the bearings 54 as shown.

For the purpose of simultaneously moving the clutch sleeves 64 toward and from each other one lever 67 is pivoted at one end to its support 68, the clutch sleeve 64 being connected to it between its ends, while the other lever 67 is pivoted to its support 68 between its ends, its clutch sleeve 64 being connected with it at one end, as shown in Fig. 2. The levers 67 are connected together by a rod or bar 69, so that both levers 67 will be moved together.

70 is a lever suitably pivoted on the frame 1, and arranged to move levers 67 to disengage clutches 63, 63 when operated by the driver.

Within the troughs 15 and chutes 16 are elevators 71 arranged to carry the cotton from the picker stems or cylinders 23 to suspended bags or receptacles 72. The elevators 71 are in the form of endless belts or the like that carry projections or fingers 73 to engage the cotton to propel it. At the forward ends of the troughs 15 the elevators or belts 71 pass over rollers or wheels 74 suitably journaled in said troughs. At the rear of the troughs 15 is a roller 75 under which the lower part of the elevator or belt 71 passes to guide the latter within the chute 16. (See Figs. 5 and 13.)

The elevators or belts 71 are preferably constructed and guided as follows: On opposite sides of the belts are endless chains $71^a$ having side lugs $71^b$ riveted or otherwise fastened to the sides of the belt. On the sides of the trough 15 and chute 16 are horizontal channels $71^c$ (see Fig. 12) through which the chains $71^a$ pass and are guided. The channels $71^c$ are shown composed of webs or angle irons $71^d$, secured in pairs to the inner opposite walls of trough 15 and chute 16, said angle irons at the juncture of said trough with said chute being carried at $71^e$ to guide the chains from 15 to 16. (See Fig. 13.) By means of channel $71^c$ the elevator or belt 71 is kept from sagging and also properly guided. At the upper parts of the chutes 16 are guide wheels or rollers 76 over which the elevators or belts 71 are guided, so that the cotton may drop therefrom into the receptacle or bags 72. The wheels or rollers 76 are secured to shafts 77 that are journaled on the supports 17. The wheels 74, 75 and 76 are, or may be, all substantially alike, and are shown in detail in Fig. 14. Two sprocket wheels 76 are shown on shaft 77 at suitable distances apart to receive chains $71^a$, whereby the belt 71 is suspended between said wheels, and thus kept taut. By this means the belt 71 is positively carried and danger of slipping and injury is avoided. To the shafts 77 are secured bevel gear wheels 78 that mesh with miter gears 79 carried by the shafts 20, so that as the latter turn to rotate the stems or cylinders 23, the elevators 71 will be driven to carry the cotton picked by the cylinders and hackles up to the receptacles 72. The receptacles 72 are preferably bags removably carried by the machine, and are shown supported at their upper open ends by rings 80 carried by the machine in suitable manner, said rings having pins 81 upon which the bags can be hung. The upper back part of chute 16 is open, and has an outwardly turned lip 80 (see Fig. 5) under which one edge of bag 72 lies to keep the bag in position.

In Fig. 13 the trough 15 and chute 16 are shown fastened together by cleats $16^a$ riveted or otherwise secured to said parts.

82 is a pole piece or the like to which the draft animals can be attached for propelling the machine.

From the foregoing description it will be observed that the sets of inclined cylinders 23 form a V having the opening forward or in the direction of travel of the machine, and that any desired width or angle between the sets of cylinders can be effected by adjusting the supporting parts 11, 18 and 60 laterally of the machine, thereby moving the frames that carry the picker stems or cylinders 23.

In operation the cotton bush is received between the sets of stems or cylinders 23, the lower forward parts of the cylinders first encountering the lower part of the bush, where it is strongest and where the passageway between them is the widest. As the machine advances the cylinders gradually pass along upwardly of the bush, while the hackle pins pick and pull the cotton from the bolls and carry it around so that it can be deposited on the elevators or belts 71. This gradual upward feeding of the hackle cylinders along the bushes will not injure the latter, as the lower parts of the cylinders 23 first begin to recede from the lower part of the bush, and so on gradually upward until merely the top of the bush is in engagement with a small portion of the cylinders and the narrow part of the passage between them. By this means the tendency to drag or bend a bush over as the machine advances (as the machines having horizontal cylinders do) is avoided, and thus snapping of bolls from the bush is overcome. Another advantage is that the cylinder operating gearing is all at the upper part of the machine above the tops of the bushes, whereby injury to the bushes and machinery is prevented.

It will be further understood that the picker stems or cylinders 23 form walls between which the cotton bush can be received, and that the wall is substantially continuous vertically in that the stems or cylinders composing each wall extend in an upward direction from one of their ends sufficiently high to reach above the tops of ordinary cotton bushes. By this means also the hackle pins or fingers present a substantially unbroken vertical wall of cotton picking points or projections, the area of picking surface being thereby largely increased, as there are practically no horizontal spaces between the pins or fingers in which cotton bolls could pass and escape the picking pins or fingers, as is the case in the cotton harvesters having horizontal stems or cylinders.

When the vertical substantially unbroken wall of picker stems encounters the cotton bush it will pass easily along the same without injury as there are no prominent projectors to push or rub against twigs, stems, bolls, &c., as is the case in cotton harvesters having horizontal picker stems, where the butt ends of the stems first rub against the bush.

A great advantage with my upwardly arranged picker stems is that a fewer number of stems or cylinders is needed to encompass a cotton bush than with horizontally arranged stems, as each stem reaches the full height of the bush, and thus encounters bolls at whatever height they may be according to the season of ripening. Then again no adjustment of stems or cylinders is needed, in a vertical direction, to compensate for the different height of ripened bolls in accordance with the season, as is often done with horizontally arranged cylinders. With my improved arrangement the bush can be picked cleaner than with horizontal stems or cylinders on account of the practically uninterrupted wall of stems or cylinders than may be adjusted at any desired distance apart and conveyed at suitable angles to receive between the walls bushes of different sizes.

While my improved picker stems or cylinders are inclined they are still superposed, whereby the above mentioned wall of stems is produced.

Many of the details of the present structure can be changed or altered, and the main features of this invention embodied in various forms of devices, without departing from the spirit thereof.

I claim—

1. In a cotton harvester, the combination of the picker frame, a plurality of picker cylinders arranged to form two opposing walls of superposed picker stems, the stems diverging from the rear forwardly, supports for the cylinders, whereby they are given an upward inclination from the front to the rear, the vertical space below the top of the rearmost pickers being free and clear, whereby the lower forward part of the pickers can engage the widest part of the bush, and the upper rear portion the narrow part of the bush after the lower forward part is clear, substantially as described.

2. In a cotton harvester, a wall of superposed and upwardly extending picker stems that are inclined from front to rear, and means for actuating the latter to pick the cotton, substantially as described.

3. In a cotton harvester, two opposing converging walls of superposed upwardly extending picker stems, that are inclined upwardly from the front to the rear, and adapted to receive cotton bushes between them, combined with means to actuate said stems to pick the cotton, substantially as described.

4. In a cotton harvester, two walls of superposed upwardly extending picker stems, that are inclined upwardly from the front to the rear, combined with means for adjusting said walls toward and from each other as desired, and means for actuating said stems, substantially as described.

5. In a cotton harvester, a main frame, vertical laterally adjustable frames carried thereby having a space between them, walls composed of a plurality of upwardly inclined picker stems carried by said frame, and means for actuating said stems, substantially as described.

6. In a cotton harvester, a frame combined with a series of superposed picker stems or cylinders carried thereby and which are inclined upwardly from the front to the rear and means for actuating said stems or cylinders, substantially as described.

7. In a cotton harvester, a main frame combined with picker frames carried thereby on opposite sides, and with a series of superposed picker stems or cylinders carried by said picker frames, said stems being inclined upwardly from the front to the rear substantially as described.

8. In a cotton harvester, a main frame combined with an oblique or rhomboidal frame carried thereby, and a series of superposed picker stems or cylinders carried by said oblique frame and extending in an upwardly and rearwardly inclined direction, substantially as described.

9. In a cotton harvester, a main frame combined with an oblique or rhomboidal frame carried thereby, the lower portion of said frame being trough like, the rear portion being chute like, and with a series of superposed inclined picker stems or cylinders carried by the frame and extending in an upwardly and rearwardly inclined direction, substantially as described.

10. In a cotton harvester, the combination of a main frame, picker frames carried thereby, rods carried by said picker frames, supports or brackets 25 carried by said rods, said brackets having bifurcated arms turned at an angle, picker stems or cylinders carried by said frames, heads on said stems or cylinders, shanks 27 on said heads carried by said bifurcated arms, gears connected with said stems or cylinders, a rotary shaft journaled on said frames, gears on said shaft meshing with the gears on the cylinders, and means for turning said shaft, substantially as described.

11. In a cotton harvester, a main frame composed of the cross beam 1, uprights 2, longitudinal beam 5, and cross bars 6, 6 combined with hangers 9 carried by the bars 6, frames supported by said hangers, and picker stems or cylinders carried by said frames, substantially as described.

12. In a cotton harvester, a frame having cross bars 6, 6, hangers 9 suspended therefrom and adjustable thereon, picker frames supported by said hangers, shafts 20 journaled on pairs of said hangers, gears 21 and 59 on said shafts, gearing 56, 57 and 58 adjustably carried by the main frame, and inclined picker stems or cylinders carried by said picker frames, and having gears to mesh with the gears 21, substantially as described.

13. In a cotton harvester, a main frame having cross bars 6, 6 combined with hangers 9 carried thereby, rods 24 carried by pairs of said hangers, supports or brackets on said rods, stems or cylinders having heads secured to said supports or brackets, shafts or spindles passing through said heads for turning said cylinders, gears 22 on said shafts, rotary shafts 20 journaled on pairs of said brackets, gears on said shafts 20 to mesh with the gears 22, and means for turning the shafts 20, substantially as described.

14. In a cotton harvester, the combination of a main frame having cross bars 6, 6, hangers 9, 9 adjustable thereon, certain of said hangers having rods 14 secured to them, troughs 15 secured to said rods, chutes 16 connected to said troughs 15, supports 17 connected with said chutes and with said hangers, and means for holding said hangers in position on the bars 6, substantially as described.

15. The combination of a main frame having cross beam 1, shaft 53, means for turning it, and gear wheels 55 on said shaft, with picker frames adjustably carried by said main frame, an adjustable frame or bearing 60 on beam 1, shaft 57 carried thereby, gears 56, 58 on said shaft, the gear 56 engaging gears 55, picker frames adjustably carried by the main frame, shafts 20 carried by said picker frames, gear wheels 59 on said shaft meshing with gears 58, picker stems or cylinders carried by said picker frames, and gearing between said stems or cylinders, and said shafts 20, all arranged for operation, substantially as described.

16. In a cotton harvester, a main frame combined with independent picker frames carried thereby, a series of inclined picker stems or cylinders carried by each picker frame, heads 28$^a$ for said stems at their lower parts, brackets 34 carried by said picker frames to support the heads 28$^a$, other heads 28 at the upper part of said cylinders, means for supporting said heads 28, and means for turning said stems or cylinders, substantially as described.

17. In a cotton havester, a picker stem or cylinder having stationary heads and means for turning said stem, said stem having peripheral apertures through which pins are arranged to be projected combined with a rod carried by said heads parallel to said stems, guards mounted over said stem or cylinder and projections or sleeves carried by said guards for connection with said rod, substantially as described.

Signed at the city, county, and State of New York, this 21st day of July, 1893.

GEORGE LISPENARD.

Witnesses:
HERBERT F. DURBUR,
JOSEPH. L. LEVY.